United States Patent Office 3,498,155
Patented Mar. 3, 1970

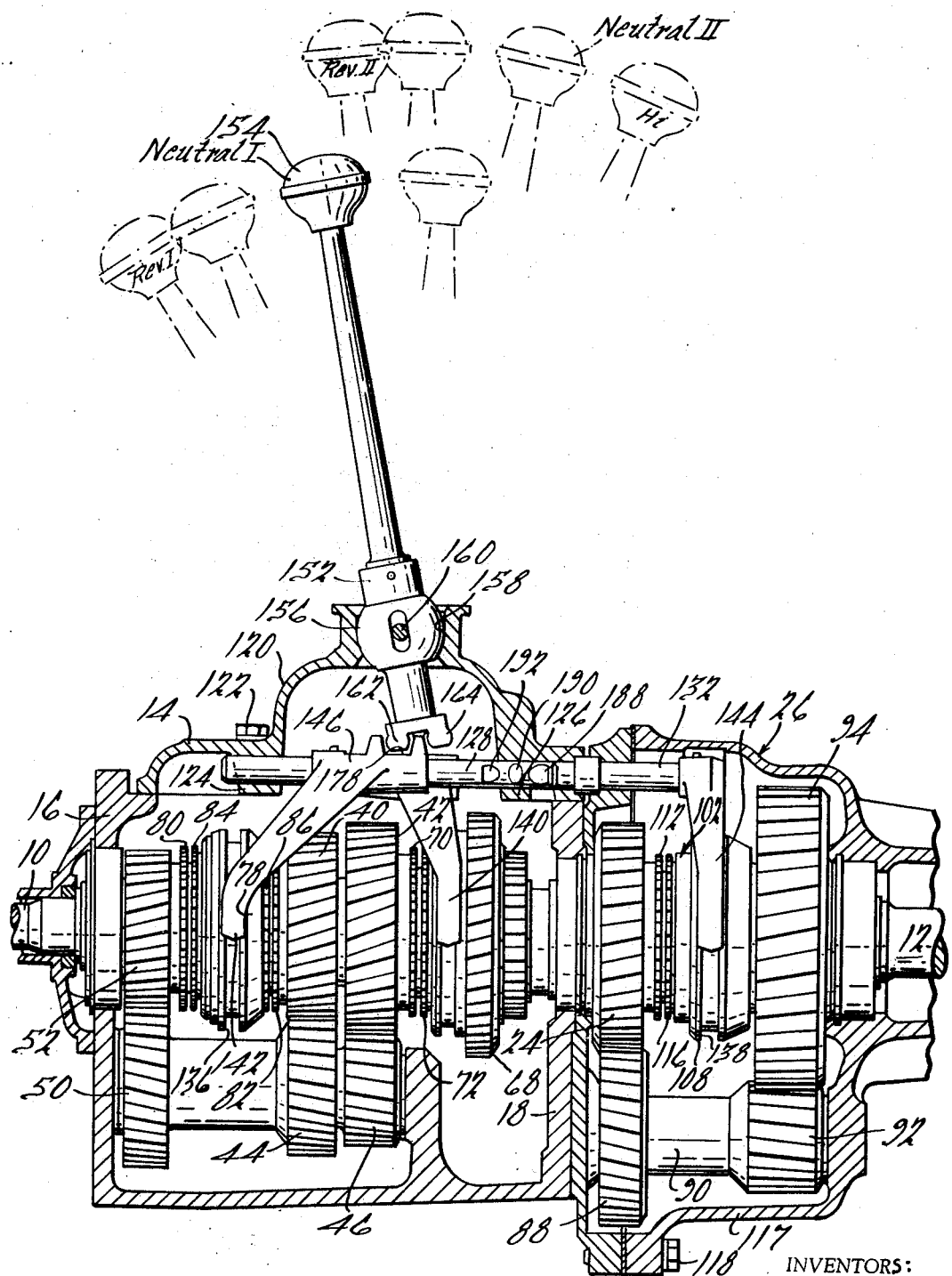

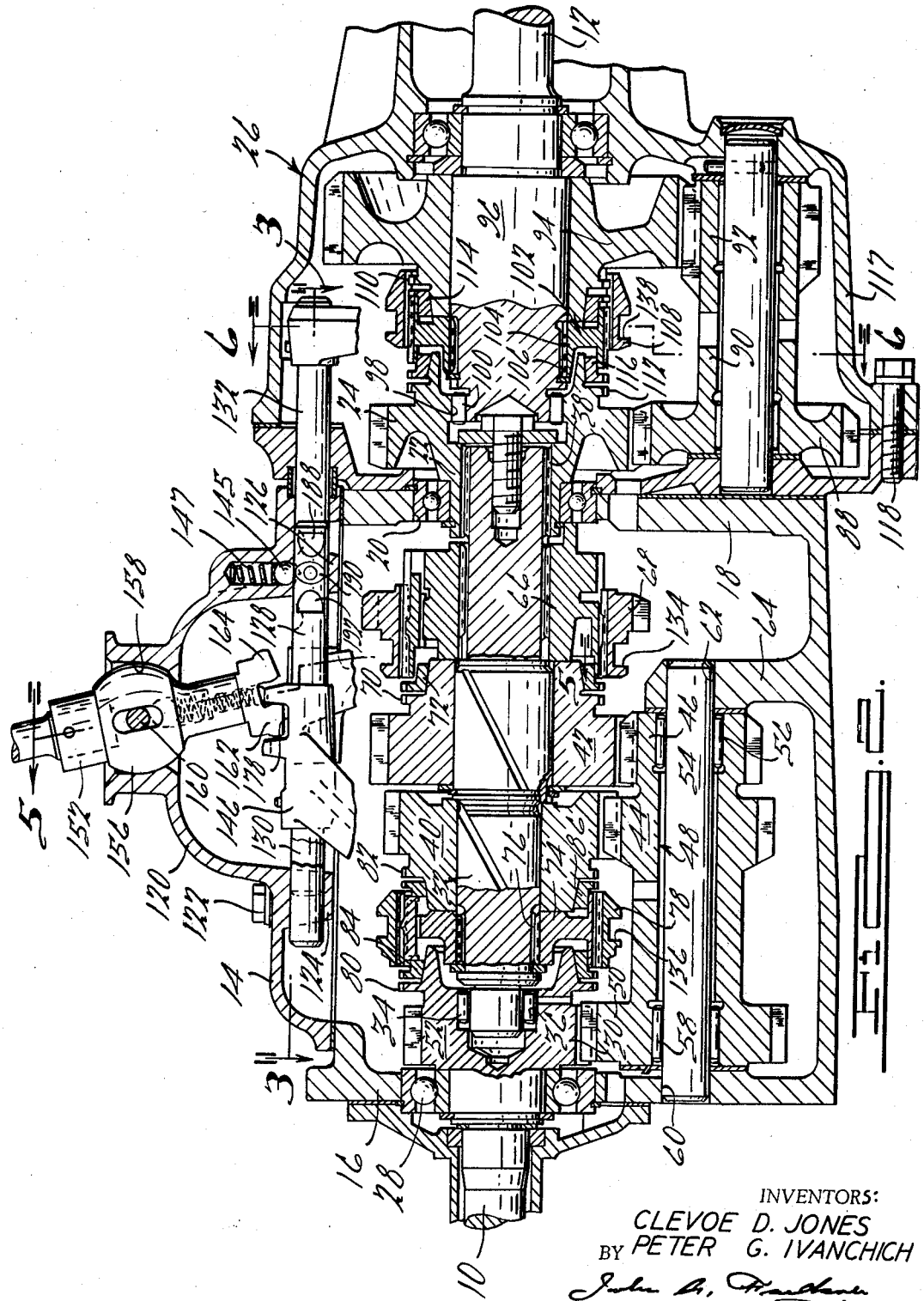

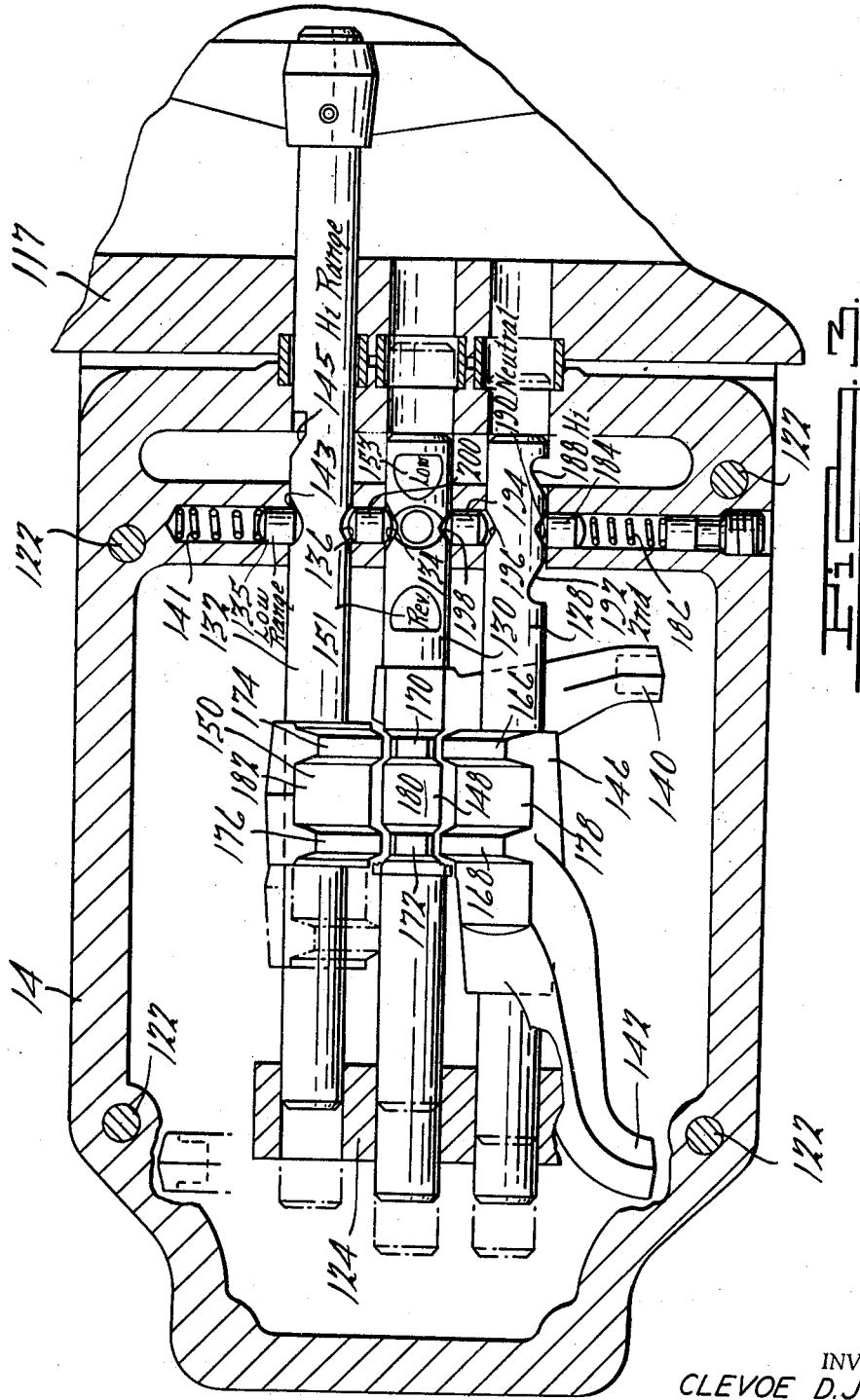

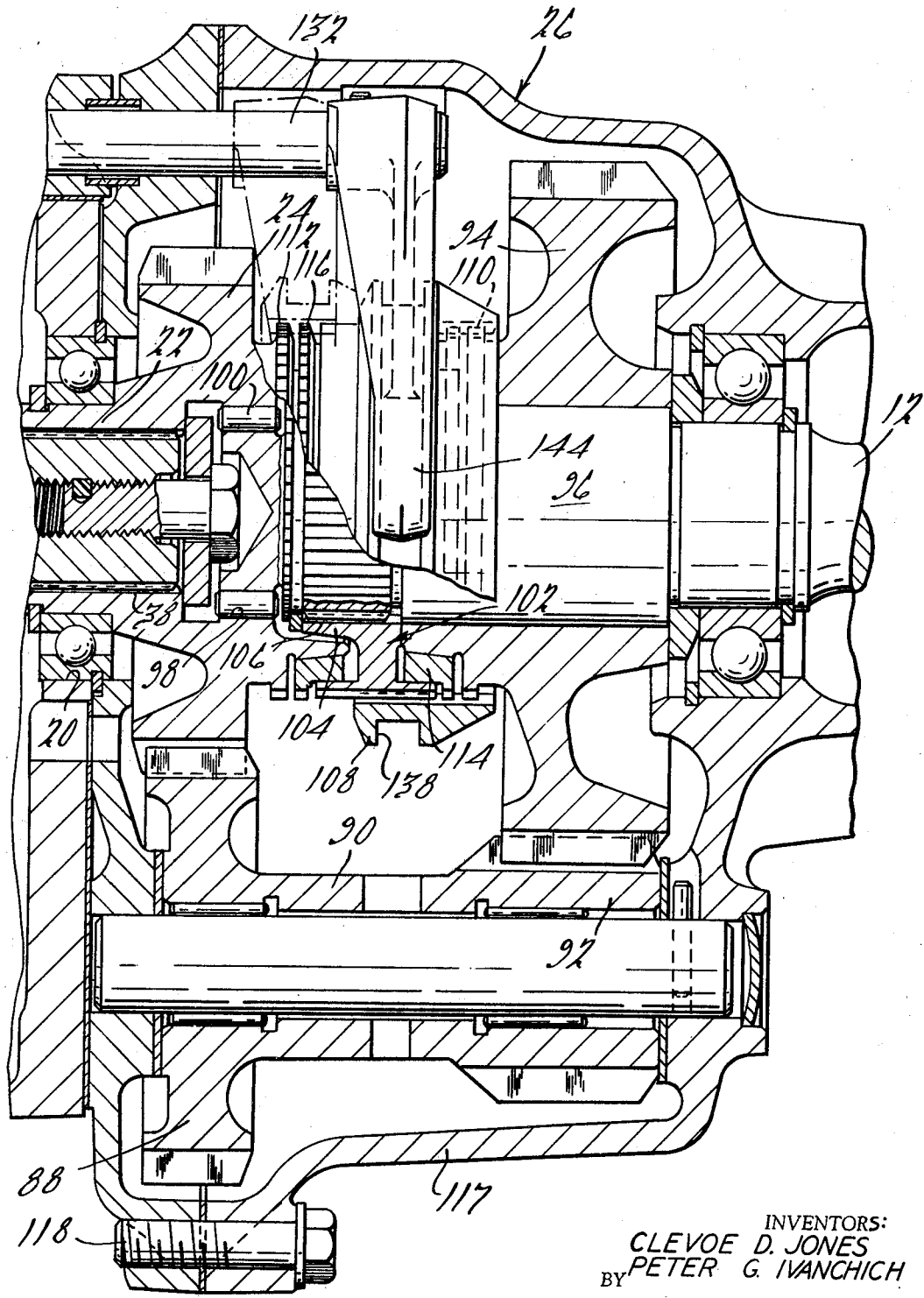

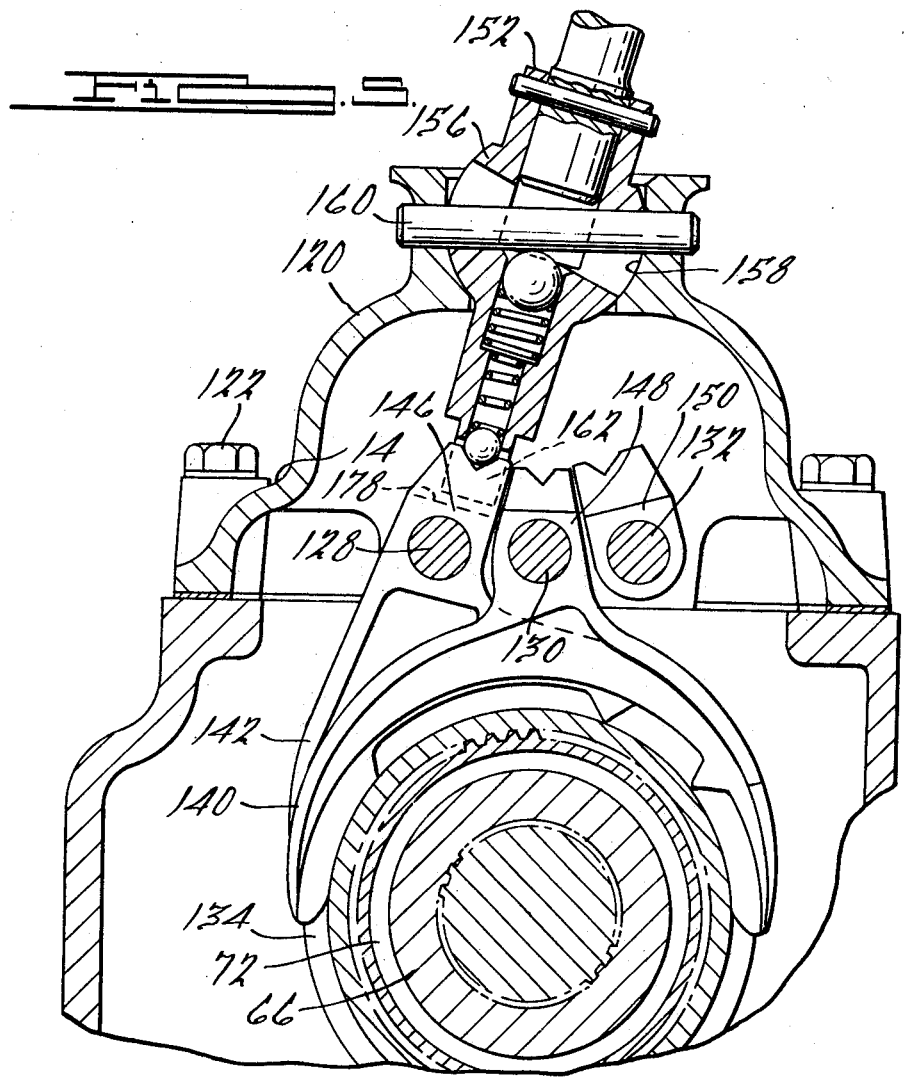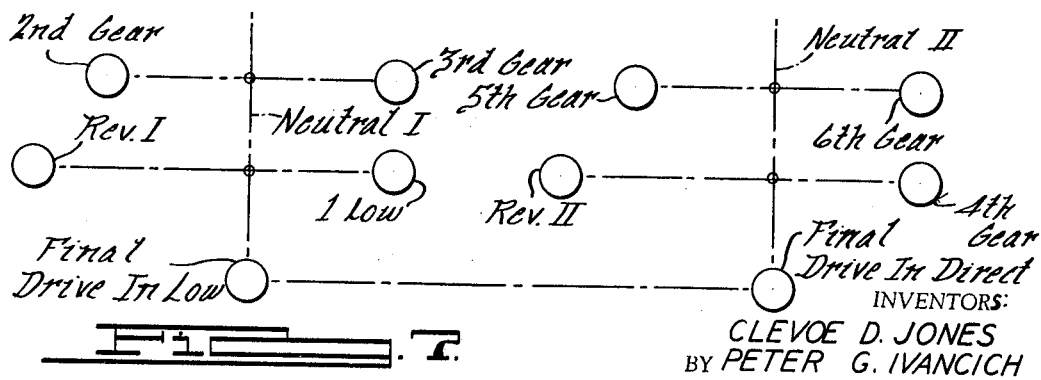

3,498,155
MULTIPLE-RATIO, MANUALLY-CONTROLLED POWER TRANSMISSION MECHANISM WITH TWO DRIVE RANGES
Peter George Ivanchich, Dearborn, and Clevoe D. Jones, Franklin, Mich., assignors to Ford Motor Company, Dearborn, Mich., a corporation of Delaware
Filed Apr. 29, 1968, Ser. No. 724,940
Int. Cl. F16h *3/02*
U.S. Cl. 74—745                                             8 Claims

ABSTRACT OF THE DISCLOSURE

A geared power transmission comprising auxiliary gearing and a cooperating synchronizer clutch mechanism for establishing a direct-drive connection between the torque output element of the main transmission gearing and the output shaft during a first driving mode, and for establishing an auxiliary speed-ratio witr the auxiliary gearing during operation in another mode, including synchronizer clutches controlled by shift forks carried by axially movable shift rails wherein separate motion transmitting patterns for the gearshift mechanism cause controlled shifting movement of the shift rails, including the shift rail for the auxiliary gearing, each pattern corresponding to its separate driving mode.

GENERAL DESCRIPTION OF THE INVENTION

Our invention is adapted to be used in the drive-line of an automative vehicle for delivering driving torque from an internal combustion engine to the vehicle traction wheels. In known transmission mechanisms having manually selected ratios, it is common practice to mount torque output gears for rotation about a common axis for the driving member and the driven member. Each gear engages one element of a cluster gear assembly which is mounted for rotation about an axis parallel to the output gear axis. Synchronizer clutches are provided for selectively connecting the output gears to the driven shaft. The synchronizer clutches are actuated and released by shifter forks which cause clutch sleeves for the synchronizer clutches to engage and disengage upon axial movement thereof with respect to the output shaft.

The shifter works are carried by shift rails mounted for axial movement in the transmission housing. The shift lever, which is actuated by the vehicle operator, selects individually the various shift rails and moves them in either one axial direction or the other to cause corresponding actuation or release of one of the synchronizer clutches.

The mechanism includes an interlock system which prevents movement of one shift rail in an axial direction until each of the other shift rails has been returned to its neutral position.

The improvement of our invention includes an auxiliary gearing system located between the driven shaft and the torque output gears. Like the other gears, the elements of the auxiliary gearing are controlled by a synchronizer clutch mechanism which includes a sleeve movable axially by means of a shifter fork. The same control linkage mechanism used for controlling ratio changes in the principal portions of the transmission mechanism is used also to control sliding movement of the shift rail for the auxiliary gearing.

The auxiliary gearing provides two different ratio ranges. When the auxiliary gearing is conditioned for high speed range, the gear shift mechanism follows a first shifting pattern that permits shift rail selection in the main gearing portion of the mechanism as the shift lever assumes one angular disposition and that permits a second shifting pattern to be followed when the auxiliary gearing is in a low speed-ratio condition as the shift lever assumes a second angular disposition. At that time the gear shifting mechanism assumes a second angular disposition. This is accomplished by providing two independent, releasable, motion-transmitting connections between the operating end of the gearshift lever itself and each of the various transmission shift rails.

BRIEF DESCRIPTION OF THE FIGURES OF THE DRAWINGS

FIGURE 1 shows in longitudinal cross-sectional form, a transmission mechanism embodying our invention, the synchronizers of which are shown in elevation.

FIGURE 2 is a view similar to FIGURE 1 with the gear elements and synchronizers shown in section.

FIGURE 3 is a plan view, partly in section, taken along the plane of section line 3—3 of FIGURE 2.

FIGURE 4 is an enlarged, cross-sectional view of the auxiliary gearing portion of the FIGURE 2 construction.

FIGURE 5 is a cross-sectional view taken along the plane of section line 5—5 of FIGURE 2.

FIGURE 7 is a schematic drawing showing the shifting motion pattern for the gearshift lever shown in FIGURES 1, 2 and 5.

PARTICULAR DESCRIPTION OF THE INVENTION

Figure 6:
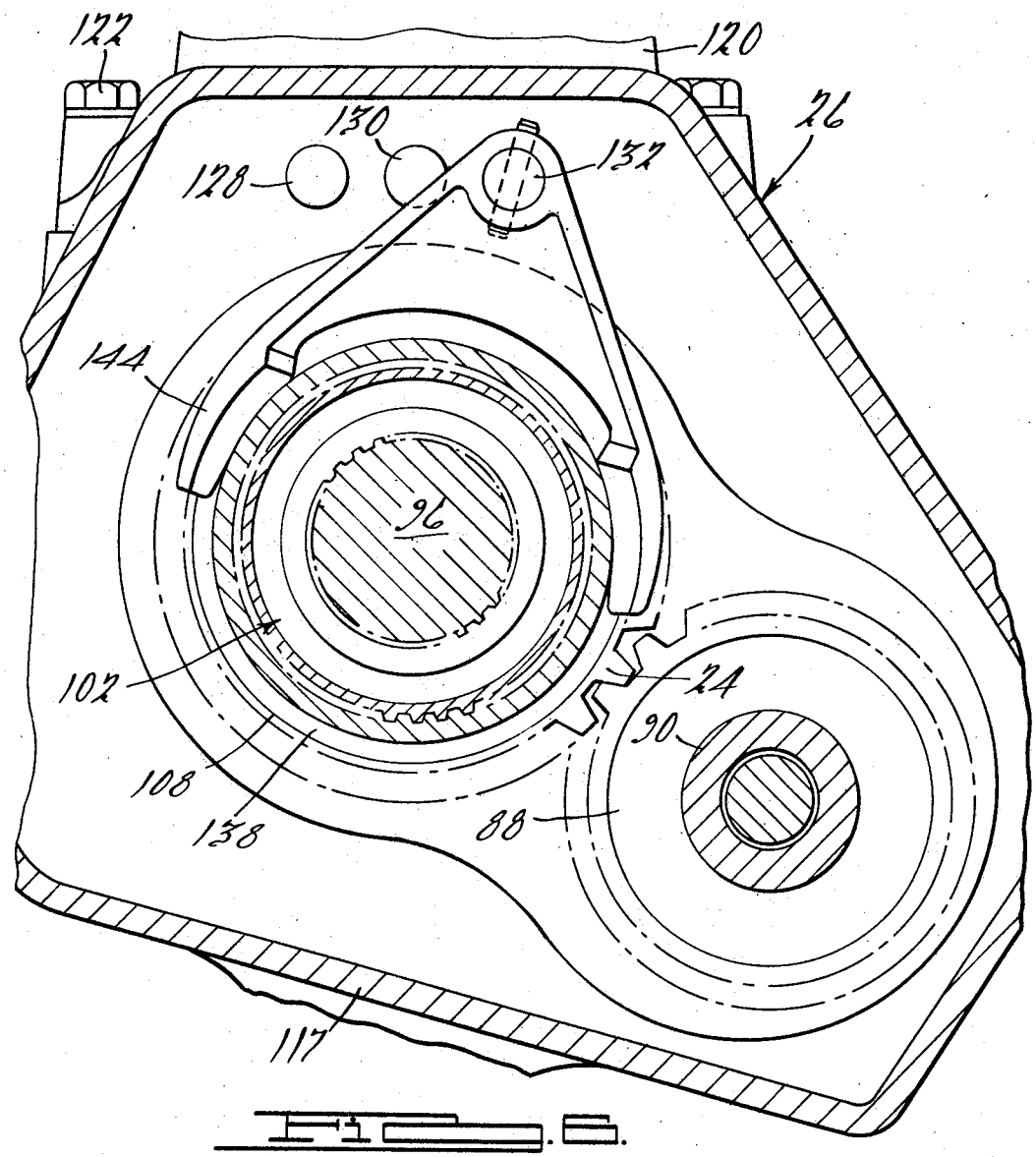
FIGURE 6 is a transverse, cross-sectional view taken along the plane of section line 6—6 of FIGURE 2.

In FIGURE 1, numeral 10 designates the power input shaft for the transmission mechanism and numeral 12 designates the power output shaft. Shaft 10 can be connected through a suitable neutral clutch to the crankshaft of an internal combustion engine. Shaft 12 can be connected to the traction wheels through a driveshaft and differential-and-axle assembly.

The transmission housing is designated generally by reference character 14. The forward wall 16 of the housing 14 is connected to a transmission clutch bell housing, which in turn is bolted to the engine block for the internal combustion engine. The rear wall 18 of the housing 14 is formed with a bearing opening 20 for receiving a bearing that in turn supports the hub 22 of torque output gear 24. This forms a part of auxiliary gear unit identified generally by reference character 26.

The forward wall 16 is formed with a bearing opening that receives bearing 28 which supports shaft 10 and power input gear 30. By preference, shaft 10 and gear 30 are formed integrally.

A transmission intermediate shaft 32 is journalled at its left-hand end in pilot bearing 34, which is received within the bearing opening 36 in the center of the gear 30. The right-hand end of shaft 32 is splined at 38 to an internally splined opening in the hub 32 for the gear 24. Gear 40, which is one of the torque output gears for the transmission mechanism, is journalled on the shaft 32. A second power output gear 42 also is journalled on the shaft 32. Each gear 40 and 42 is in continuous, meshing engagement with a separate gear element as shown at 44 and 46. These form a part of the cluster gear assembly 48.

Power output gear element 50 for the cluster gear assembly 48 continuously meshes with power input gear 52. This is connected directly to the shaft 10 and is pivoted rotatably by the bearing 28 in the forward wall 16.

Cluster gear assembly 48 is pivoted rotatably on counter shaft 54 by means of spaced bearings 56 and 58. The ends of the counter shaft 54 are end supported by the transmission housing. For this purpose the left-hand end is received in wall spring 60 formed in the forward wall 16 and an opening 62 formed in boss 64. This boss is formed integrally with the housing 14.

Shaft 32 is splined to the internally splined hub 66 of a low-and-reverse gear shown at 68. The outer periphery of the hub 66 is splined to receive spline teeth formed in the gear 68.

Gear 42 carries external clutch teeth 70, which can be engaged by the internal teeth of the gear 68. It acts also as a synchronizer clutch sleeve. Situated between the gear 68 and the teeth 70 is an externally-toothed synchronizer blocker ring 72, which establishes synchronism in the motion of the gear 42 with respect to the gear 68 as the gear 68 is moved in a left-hand direction with reference to FIGURE 1.

A double-acting synchronizer clutch assembly is used to clutch selectively the shaft 32 to the gear 40 and to the gear 52. This clutch assembly includes a hub 74 splined at 76 to the shaft 32. A double-acting clutch sleeve 78 is carried by an externally-splined periphery of the hub 74. The spline teeth of the sleeve 78 form clutch teeth that engage external clutch teeth 80 and 82 carried by the gears 52 and 40, respectively. Synchronizer blocker rings 84 and 86 are situated between the hub 74 and the gears 52 and 40, respectively.

The shaft 32 is splined at 38 to gear 24. As mentioned earlier, this gear engages continuously final drive gear element 88 which forms a part of countershaft 90. Formed also on counter shaft 90 is gear 92, which meshes continuously with output gear 94. This gear is journalled on power output shaft 96, the left-hand end of which is journalled in bearing opening 98 formed in gear 24, a suitable bearing 100 being provided for this purpose. Gear 24, in turn, is journalled in bearing opening 20 formed in wall 18.

Another synchronizer clutch assembly 102 is provided to connect and disconnect selectively the shaft 96 and each of the gears 24 and 94. The assembly 102 includes a hub 104, which is splined at 106 to the shaft 96. The outer periphery of the hub 104 is formed with external splines which register with internal splines formed on clutch sleeve 108. This sleeve is adapted to register with external clutch teeth 110 and 112 carried respectively by gears 94 and 24. Synchronizer blocker rings 114 and 116 are situated between the hub 104 and each of the gears 96 and 24, respectively.

The final drive gearing, shown in part at 88 and 92, is enclosed by a tail shaft extension housing 117, which is bolted by bolts 118 at the right-hand end of the housing 14.

The upper side of the housing 14 includes a shift rail supporting housing structure 120. This may be bolted by bolts 122 over an access opening formed in the top of the housing 14. Housing portion 12 includes axially-spaced bosses 124 and 126, each of which is provided with shift rail openings through which the ratio controlling shift rails are received.

These rails are best seen in FIGURE 3. The second speed ratio and high-speed ratio shift rail is shown at 128. The low-and-reverse shift rail is shown at 130. The shift rail 132 controls the final drive gearing as will be explained.

A reverse drive gear, not shown in FIGURE 1, is journalled within the housing 14 between wall 18 and the boss 64. A reverse drive pinion engages continuously the gear element 46.

When the gear element 68 is moved in a left-hand direction, its internal teeth become clutched to the external teeth 70, thereby establishing a driving connection between gear 42 and the shaft 32.

If the gear 68 is moved in a right-hand direction, it drivably engages the reverse-drive pinion, thus establishing a reverse-drive torque delivery path between the input shaft 10 and the intermediate shaft 32.

The gear 68, the sleeve 78 and the sleeve 108 each have annular peripheral grooves 134, 136 and 138 respectively. These receive the ends of shift forks 140, 142 and 144, respectively. Fork 142 is carried by a shift collar 146, which is carried by the shift rail 128. Shift fork 140 has a collar 148, which is carried by the shift rail 130. Fork 144 has a collar 150 carried by shift rail 132. The shift rails are adapted to be moved axially with respect to the axis on the shafts 10 and 96, and they shift the clutch sleeves upon shifting movement of the shift rails.

When the sleeve 78 assumes the position shown in FIGURE 1, the synchronizer clutch assembly for the intermediate and high ratios is in a neutral condition. Similarly the sleeve associated with the gear 68, as shown in FIGURE 1, is in the neutral position as gear 42 becomes disengaged from shaft 32 and as the gear teeth on the gear 68 become disengaged from the teeth of the reverse-drive pinion.

In contrast to the neutral condition for the intermediate and high synchronizer clutch and the low-and-reverse synchronizer clutch, the synchronizer clutch sleeve 108 for the final drive gearing is shown in the low drive range position. Gear 94, at that time, is clutched to the output shaft 96.

A single control lever 152 extends upwardly, the upper extremity carrying a hand grip 154.

An intermediate portion of the lever 152 forms a socket 156 which is received within the socket opening 158 formed in the housing portion 120. It is secured in place by a pin-and-slot connection 160, which will permit a limited amount of movement of the lever 152 in the direction of its axis. Spring means may be provided for maintaining normally the lever 152 in seating engagement with the socket opening 158.

The lower end of the lever 152 carries a pair of shift rail selector fingers identified by reference characters 162 and 164.

Each shift rail collar is provided with a pair of axially spaced shift rail teeth or projections. The projections for rail 128 are identified by reference characters 166 and 168. The corresponding projections for rail 130 are shown at 170 and 172. The corresponding projections for rail 132 are shown at 174 and 176.

The projections for each shift rail define therebetween a tooth space or recess. The spaces for the rails 128, 130 and 132 are identified, respectively, by reference characters 178, 180 and 182. The selector fingers 162 and 164 are adapted to be received within receses 178, 180 and 182. In FIGURE 1, finger 162 is shown registering with recess 178.

The various operating positions for the shift rails are determined by spring loaded detents. These include a first detent plunger 184 slidably situated in the detent opening. Plunger 184 is urged by detent spring 186 into engagement with one of thre detent recesses 188, 190 and 192. An intermediate detent element 194 is situated between the rails 128 and 130 and is adapted to register with one or the other of detent recesses 196 and 198 formed on the rails 128 and 130, respectively. A similar intermediate detent element 200 is situated between the rails 130 and 132 and is adapted to register with detent recesses 134 and 136 formed in the rails 130 and 132, respectively.

A spring loaded detent element 135 is spring loaded by spring 141 into engagement with detent recess 143 formed in rail 132. This defines one operating position for the rail 132. The other operating position is defined by detent recess 145.

The shift rail 130 also has a spring loaded detent which is best seen in FIGURE 1. It includes detent element 145 which is urged into engagement with each of three axially spaced detent recesses in the shift rail 130 by detent spring 147. In the condition shown in FIGURE 2, the shift rail 130 is in the neutral position. The detent element 145 engages recess 151 when the mechanism is conditioned for reverse drive operations, and it is in registry with recess 153 when the mechanism is conditioned for low speed ratio operation.

When the shift rail 130 is moved in a left-hand direction, companion shift rails 128 and 132 remain in the neutral position by reason of the action of the interlock elements 200 and 194. At that time, gear 68 is shifted in a left-hand direction thereby locking gear 42 to the shaft 32. The low speed ratio torque delivery path then is established as torque is delivered from shaft 30 through cluster gear element 50, and through cluster gear element 46 to the gear 42.

When the gear 132 is in the neutral position, the shift fork 144, which is carried at the right-hand end of the shift fork 132, moves sleeve 108 into engagement with clutch teeth 110 on the gear 94. This locks the gear 94 to the output shaft 96. The torque delivered to the shaft 32 by the main transmission gearing then is multiplied by the final drive gearing which provides a low speed ratio drive range. At this time, the fingers 162 and 164 on the gear shift lever 152 straddle the projection 170. The finger 162 is received within the recess 148.

To condition the mechanism for operation in the second speed ratio, it merely is necessary to move the shift lever 152 so that shift rail 130 is shifted to its neutral position. The shift lever 152 then is moved transversely so that the shift lever 162 will engage the recess 178 between projection 168 and 166. Fingers 162 and 164, in this instance, straddle the projection 166. After the plane oscillation for the lever 152 is changed in this fashion, lever 152 can be moved so that the shift rail 128 moves in a fore-and-aft direction. As rail 128 is shifted in a right-hand direction, synchronizer clutch sleeve 78 shifts so that it will engage clutch teeth 82 as explained previously. Before the lever 152 can be moved from engagement with shift rail 130 into engagement with shift rail 128, the shift rail 130 must be returned to the neutral position.

When the rail 128 is shifted in a left-hand direction, detent plunger 184 engages recess 188 of the rail 128 thus establishing high speed ratio operation.

During movement of the shift rails 130 and 128 upon ratio selection, the final-drive gearing will assume a speed reduction ratio condition.

If ratio selector lever 152 now is shifted transversely in the opposite direction, the fingers 162 and 164 will straddle the projection 174. If the lever 152 now is oscillated in the plane that contains the axis for shift rail 132, the shift rail 132 will shift in a left-hand direction, thereby moving the synchronizer sleeve 108 from the low speed ratio position to the high speed ratio position. The shift lever 152 then can be returned by moving it transversely until the fingers 162 and 164 straddle projection 172 rather than projection 170. Shift rail 130 then can be shifted between the neutral position and the low speed ratio position or between the neutral position and the reverse drive position, depending upon its direction of movement.

After the shift rail 130 is moved to the neutral position, the lever 152 can be adjusted further in the transverse direction until the shift fingers 162 and 164 straddle the projection 168. It is possible then for the shift rail 128 to be shifted to the second speed ratio position or to the high speed ratio position in the usual way. This ratio shifting pattern is accomplished with the fluid drive gearing in the high speed ratio. Thus two complete drive ranges are available, each drive range having three forward driving speed ratios and a single reverse ratio.

FIGURE 7 illustrates the two motion patterns for the grip 154. The left-hand side of the FIGURE 7 diagram illustrates the first as shifting phase as the shift finger 162 is effective to accomplish the shifting movement of the shift rails. The right-hand side of the FIGURE 7 diagram shows the shifting pattern that is accomplished as the shift finger 164 acts as a shifting element for the shift rails.

It is possible with our invention, to control drive range selection as well as ratio selection within each drive range by using a single control lever. No additional space penalty is required because of the presence of the dual function of the shift linkage mechanism.

Having thus described a preferred form of our invention, what we claim and desire to secure by U.S. Letters Patent is:

1. A power transmission mechanism adapted to deliver torque from a driving shaft to a driven shaft comprising a power input gear connected to the said driving shaft, an intermediate shaft, power output gears journaled on the intermediate shaft, a cluster gear assembly journaled about an axis parallel to the axis of the intermediate shaft and including gear elements continuously meshing with said input gear and said output gears, final drive gearing including a final output gear and a final drive input gear multiple clutch means including movable clutch elements for connecting selectively said output gears to said intermediate shaft and for selectively establishing and disestablishing a driving connection between said intermediate shaft and said driven shaft through said final drive gears, shift rails mounted for sliding movement and situated in parallel dispositions, shift forks carried by said shift rails a separate shift rail registering with each clutch means whereby each of said clutch means is shifted axially with respect to the axis of said intermediate shaft upon corresponding shifting movement of its associate shift rail, a shift lever journaled for universal movement in a housing portion of said mechanism, one end of said shift lever and each of said shift rails having interengageable parts situated in registry at either of two relative axial positions of the engaged shift rail with respect to the axis of the shift rail, the shift lever engaging part of one shift rail being in transverse alignment with respect to the corresponding parts of the adjacent shift rails as the one shift rail is moved to a clutch disengaging position prior to movement of said shift lever into engagement with a companion shift rail.

2. The combination as set forth in claim 1 wherein each shift rail has a shift collar, projections extending from each shift collar at axially spaced locations and defining therebetween a transversely extending recess, a shift finger on said one shift lever and being engageable with said shift rail recesses when said final drive gearing is conditioned for low speed ratio operation and a second shift finger thereon being positioned to engage said shift rail recesses when said final drive gearing is conditioned for high speed ratio operation.

3. The combination as set forth in claim 1 including an interlock means for preventing shifting movement of one shift rail when an adjacent shift rail is in a clutch engaging position and detent means for establishing the clutch engaging positions of said shift rail and a neutral position corresponding to a clutch disengaged position for said shift rails.

4. The combination as set forth in claim 2 wherein an interlock means for preventing shifting movement of one shift rail is in a clutch engaging position, and detent means for establishing the clutch engaging positions of said shift rail and a neutral position corresponding to a clutch disengaged position for said shift rails.

5. A multiple ratio power transmission mechanism adapted to deliver driving torque from a driving shaft to a driven shaft comprising a main transmission gear unit and an auxiliary final drive gear unit, said main transmission gear unit including an intermediate shaft, multiple output gears journaled on said intermediate shaft, a driving gear connected to said driving shaft, a cluster gear assembly having gear elements engaging continuously said input gear and said output gears, clutch means including a first clutch sleeve movable axially to establish clutching engagement between said input gear and said intermediate shaft and clutching engagement between said intermediate shaft and one of said output gears, and a second shaft movable in one direction to establish clutching engagement between said intermediate shaft and another output gear, said final drive gearing comprising a final output drive gear journaled rotatably on said output shaft, a final drive input gear connected to said intermediate shaft, final drive cluster gears connecting drivably said final output gear and said final drive input gear, another clutch means including an axially movable sleeve for connecting selectively said output shaft with said final drive input gear and said final drive output gear, a first shift-rail connected mechanically to the clutch sleeve for said final drive gearing, a second shift rail connected mechanically to said second clutch sleeve and a third shift rail connected mechanically to said first clutch sleeve, said shift rails being situated in parallel disposition for axial sliding movement, a single shift lever for moving said shift rails, said lever being journaled for universal movement in a stationary housing portion of said mechanism, one end of said shift lever having a pair of shift fingers, each shift rail carrying thereon a recess for receiving one or the other of said shift fingers whereby oscillating motion of said shift lever will be accompanied by shifting movement of a selected shift rail, one of such shift fingers being positioned for selective engagement with said second or third shift rails when said first shift rail is in a low speed ratio position and the other shift finger being positioned for a selective engagement with said second or third shift rails when said first shift rail assumes a high speed ratio position thereby providing two independent shift patterns for each of two selected drive ranges.

6. The combination as set forth in claim 5 wherein each shift rail has a shift collar, projections extending from each shift collar at axially spaced locations and defining therebetween a transversely extending recess, one shift finger being engageable with said shift rail recesses when said final drive gearing is conditioned for low speed ratio operation and the other shift finger being positioned to engage said shift rail recesses when said final drive gearing is conditioned for high speed ratio operation.

7. The combination as set forth in claim 5 including an interlock means for preventing shifting movement of one shift rail when an adjacent shift rail is in a clutch engaging position, and detent means for establishing the clutch engaging positions of said shift rail and a neutral position corresponding to a clutch disengaged position for said shift rails.

8. The combination as set forth in claim 6 including an interlock means for preventing shifting movement of one shift rail when an adjacent shift rail is in a clutch engaging position, and detent means for establishing the clutch engaging positions of said shift rail and a neutral position corresponding to a clutch disengaged position for said shift rails.

References Cited

UNITED STATES PATENTS

| | | | |
|---|---|---|---|
| 2,115,089 | 4/1938 | Tenney | 74—473 |
| 2,135,042 | 11/1938 | Rossmann | 74—473 |
| 2,305,927 | 12/1942 | Kummich | 74—475 XR |
| 2,892,358 | 6/1959 | Backus et al. | 74—473 |

ROBERT M. WALKER, Primary Examiner

U.S. Cl. X.R.

74—473